United States Patent [19]
Sakaue

[11] Patent Number: 6,081,625
[45] Date of Patent: Jun. 27, 2000

[54] IMAGE PROCESSING APPARATUS AND METHOD

[75] Inventor: Eiichi Sakaue, Kanagawa-ken, Japan

[73] Assignee: Kabushiki Kaisha Toshiba, Kawasaki, Japan

[21] Appl. No.: 09/041,392

[22] Filed: Mar. 12, 1998

[30] Foreign Application Priority Data

Mar. 14, 1997 [JP] Japan .................................. 9-061193

[51] Int. Cl.⁷ ........................... G06T 5/00; H04N 1/403; H04N 1/407
[52] U.S. Cl. ......................... 382/254; 358/455; 382/205; 382/274
[58] Field of Search .................................. 358/455, 456, 358/460; 382/233, 254, 274, 288, 299, 205

[56] References Cited

U.S. PATENT DOCUMENTS

| | | | |
|---|---|---|---|
| 4,551,768 | 11/1985 | Tsuchiya et al. | 358/460 |
| 4,625,222 | 11/1986 | Bassetti et al. | 347/132 |
| 4,630,125 | 12/1986 | Roetling | 358/458 |
| 4,803,558 | 2/1989 | Hiratsuka et al. | 358/457 |
| 5,309,525 | 5/1994 | Shimomura et al. | 382/50 |
| 5,459,587 | 10/1995 | Fukushima | 358/462 |
| 5,502,495 | 3/1996 | Bannai et al. | 358/447 |
| 5,506,699 | 4/1996 | Wong | 358/456 |
| 5,715,330 | 2/1998 | Kawasaka | 382/169 |
| 5,790,711 | 8/1998 | Murakami | 382/267 |

FOREIGN PATENT DOCUMENTS

| | | |
|---|---|---|
| 4-330864 | 11/1992 | Japan . |
| 4-330865 | 11/1992 | Japan . |
| 4-330866 | 11/1992 | Japan . |
| 4-330867 | 11/1992 | Japan . |
| 4-330868 | 11/1992 | Japan . |
| 4-330869 | 11/1992 | Japan . |

*Primary Examiner*—Scott Rogers
*Assistant Examiner*—Joel Shaughnessy
*Attorney, Agent, or Firm*—Finnegan, Henderson, Farabow, Garrett & Dunner, L.L.P.

[57] ABSTRACT

In the image processing apparatus of the present invention, the dot pattern analysis section determines a plurality of black pixels neighboring a notice pixel of a predetermined positioned black pixel in a window of the binary image and determines a white pixel as a compensation pixel in the window in accordance with coordinates of the notice pixel and the plurality of black pixels. A notice pixel multivalued section converts the black pixel of the notice pixel to a multivalued half tone pixel and outputs the multivalued half tone pixel based on the coordinate of the notice pixel. A compensation pixel multivalued section converts the white pixel of the compensation pixel to a multivalued half tone pixel and outputs the multivalued half tone pixel based on the coordinate of the compensation pixel.

16 Claims, 12 Drawing Sheets

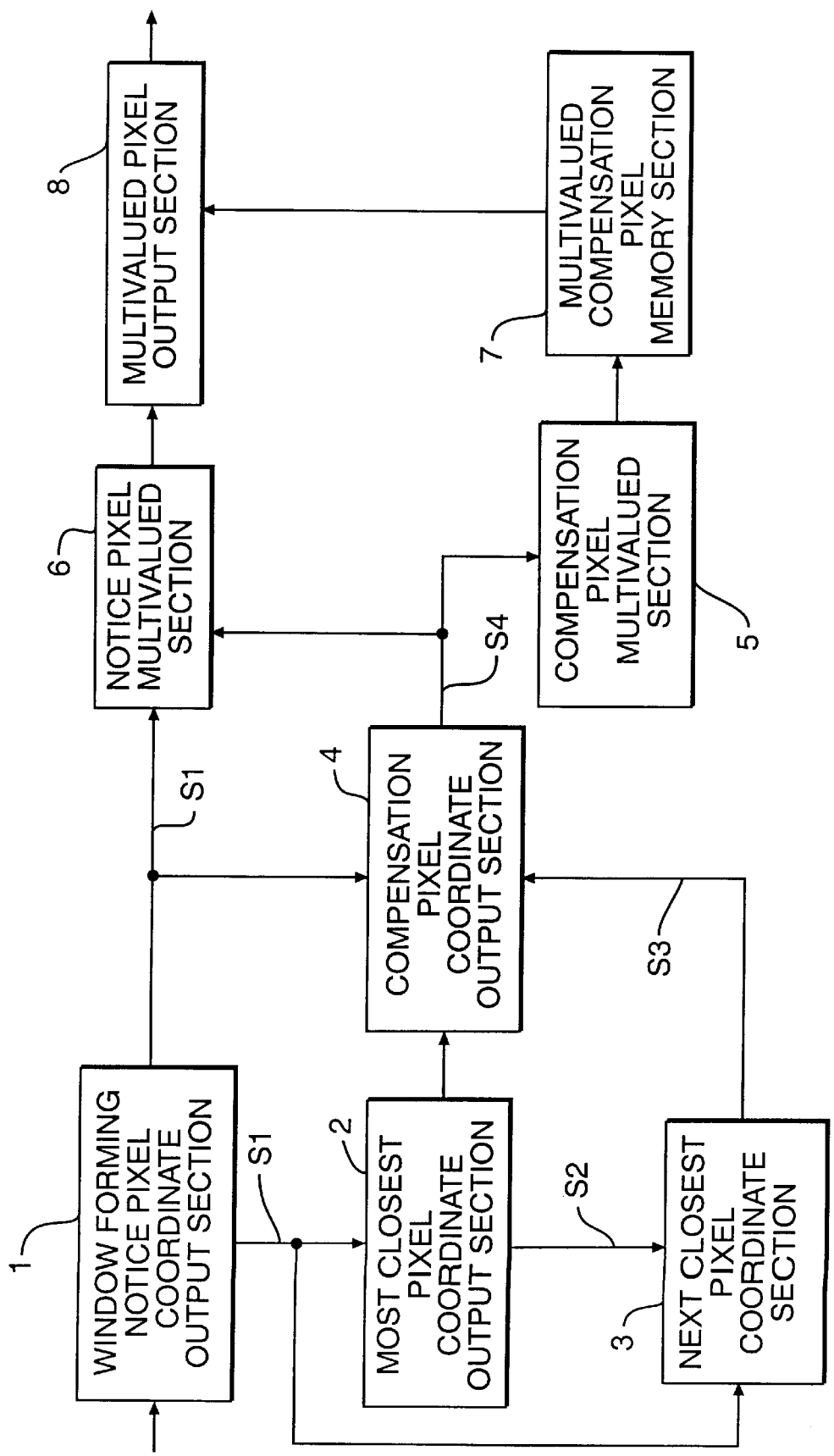

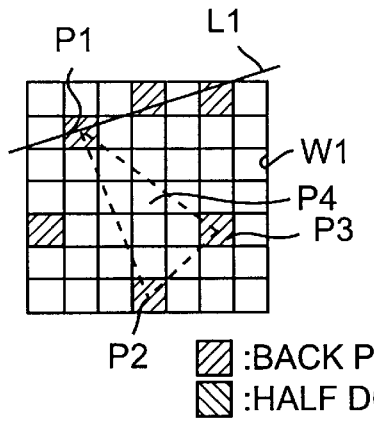
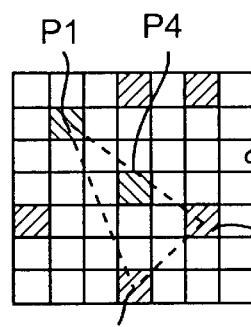
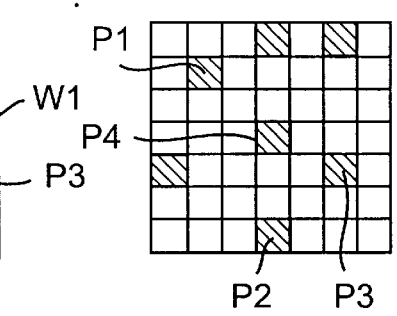
*FIG. 2A*  *FIG. 2B*  *FIG. 2C*
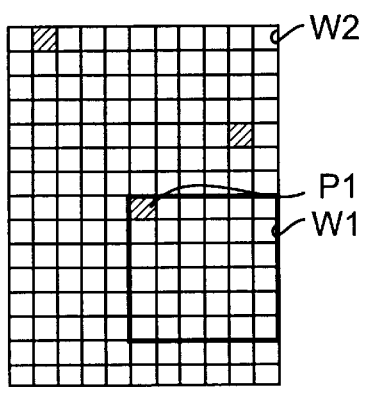
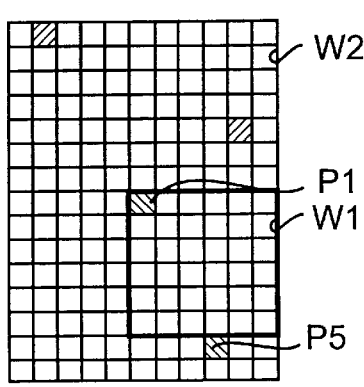
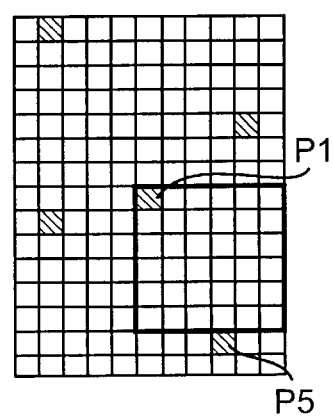
*FIG. 2D*  *FIG. 2E*  *FIG. 2F*

IMAGE PROCESSING APPARATUS AND METHOD

FIELD OF THE INVENTION

The present invention relates to an image processing apparatus and a method for converting a binary image to a multivalued image for a user's eye to naturally represent dot pattern of the image.

BACKGROUND OF THE INVENTION

As a technique to represent the multivalued image (gray-scale image) by a small quantity of data, a pseudo-gradation image (half-toning) is used. For example, in an apparatus to only output an image data of small scale pixel such as binary (1 bit) or four values (two bits), the multivalued image of large scale pixel such as 256 values (8 bits) per one pixel is recorded or displayed by using the pseudo-gradation image. In this method, as for spatially averaging ability of a human's eye, gradation of display is falsely represented by average of pixel density per local area. A dithering in printing technique is one of the pseudo-gradation image. The pseudo-gradation image can represent the multivalued image by the small quantity of data and it is used in image communication between the apparatuses.

As one of the pseudo-gradation image, an error-diffusion method is used. In the error-diffusion method, density of a notice pixel in an original image is quantized to a small scale (binary) coincident to expression ability of the apparatus. A quantized error is added to density of unprocessed pixel neighboring the notice pixel in the original image in order to compensate the density of the original image. This method is suprior to the dithering in respect of detail expression and widely used in the image communication between the apparatuses. However, in the error-diffusion method, granular texture often appears in a converted image and the observer receives noise feeling as granular rough pattern. Furthermore, in an image area which density is constant, texture noise of snake-like uniquely appears in the error-diffusion image.

Recently, gradation expression ability of the image output apparatus grows up and a large gradation compared with original gradation of the pseudo-gradation image can be represented. As a result, a multivalued technique to convert gray-scale number per one pixel of the error-diffusion image to higher gray-scale number in order to reduce the texture noise and the rough feeling. As a representative method of the multivalued technique, multivalued estimation method is used. In the multivalued-estimation method, a window consisted of predetermined number of pixels along main scanning direction and sub scanning direction is formed as a center of the notice pixel in the binary image. An average value of density of all pixels in the window is calculated and this average value is used as multivalued-data of the notice pixel. However, in this method, the multivalued-data is only determined by average density of all pixels in the window and pixel pattern formed by distribution of pixel density in the window is not taken into consideration. Therefore, snake-like texture noise still remains in the multivalued image and this noise is further emphasized. Furthermore, in the image processing apparatus to use the multivalued-estimation method, size of the window is limited by capacity of a line buffer. Therefore, if the capacity of the line buffer is small, the density average of pixels in wide area is difficult to be calculated. The multivalued estimation in high-light area whose pixel density is low is not correctly calculated and the texture noise is not reduced to desired level.

SUMMARY OF THE INVENTION

It is an object of the present invention to provide the image processing apparatus and a method to reduce the snake-like texture noise in the multivalued image converted from the binary image.

According to the present invention, there is provided an image processing apparatus for outputting a multivalued image converted from a binary image, comprising: a window forming means for forming a window consisted of a predetermined number of pixels along a main scanning direction and a sub scanning direction on the binary image; a notice pixel coordinate output means for determining a predetermined positioned black pixel in the window as a notice pixel, and for outputting a coordinate of the notice pixel; a neighboring pixel coordinate output means for determining two black pixels neighboring the notice pixel in the window, and for outputting coordinates of the two black pixels; a compensation pixel coordinate output means for determining a center positioned white pixel among the notice pixel and the two black pixels in the window as a compensation pixel, and for outputting a coordinate of the compensation pixel; a notice pixel multivalued means for converting the black pixel of the notice pixel to a multivalued half tone pixel, and for outputting the multivalued half tone pixel based on the coordinate of the notice pixel; a compensation pixel multivalued means for converting the white pixel of the compensation pixel to a multivalued half tone pixel, and for outputting the multivalued half tone pixel based on the coordinate of the compensation pixel.

Further in accordance with the present invention, there is also provided an image processing method for outputting a multivalued image converted from a binary image, comprising the steps of: forming a window consisted of a predetermined number of pixels along a main scanning direction and a sub scanning direction on the binary image, determining a predetermined positioned black pixel as a notice pixel in the window, outputting a coordinate of the notice pixel; determining two black pixels neighboring the notice pixel in the window; outputting coordinates of the two black pixels; determining a center positioned white pixel among the notice pixel and the two black pixels in the window as a compensation pixel; outputting a coordinate of the compensation pixel; converting the black pixel of the notice pixel to a multivalued half tone pixel; outputting the multivalued half tone pixel based on the coordinate of the notice pixel; converting the white pixel of the compensation pixel to a multivalued half tone pixel; and outputting the multivalued half tone pixel based on the coordinate of the compensation pixel.

Further in accordance with the present invention, there is also provided an image processing apparatus for outputting a multivalued image converted from a binary image, comprising: a dot pattern analysis means for determining a plurality of black pixels neighboring a notice pixel of a predetermined positioned black pixel in a window of the binary image, and for determining a white pixel as a compensation pixel in the window in accordance with coordinates of the notice pixel and the plurality of black pixels; a notice pixel multivalued means for converting the black pixel of the notice pixel to a multivalued half tone pixel, and for outputting the multivalued half tone pixel based on the coordinate of the notice pixel; and a compensation pixel multivalued means for converting the white pixel of the compensation pixel to a multivalued half tone pixel, and for outputting the multivalued half tone pixel based on the coordinate of the compensation pixel.

Further in accordance with the present invention, there is also provided an image processing method for outputting a multivalued image converted from a binary image, comprising the steps of: determining a plurality of black pixels neighboring a notice pixel of a predetermined positioned black pixel in a window of the binary image; determining a white pixel as a compensation pixel in the window in accordance with coordinates of the notice pixel and the plurality of black pixels; converting the black pixel of the notice pixel and the white pixel of the compensation pixel to each multivalued half tone pixel; and outputting the multivalued half tone pixels of the notice pixel and the compensation pixel.

BRIEF DESCRIPTION OF THE DRAWINGS

FIG. 1 is a block diagram of the image processing apparatus according to a first embodiment of the present invention.

FIGS. 2A~2F are schematic diagrams of processing content of the image processing apparatus according to the present invention.

DETAILED DESCRIPTION OF THE PREFERRED EMBODIMENTS

Figure 3:
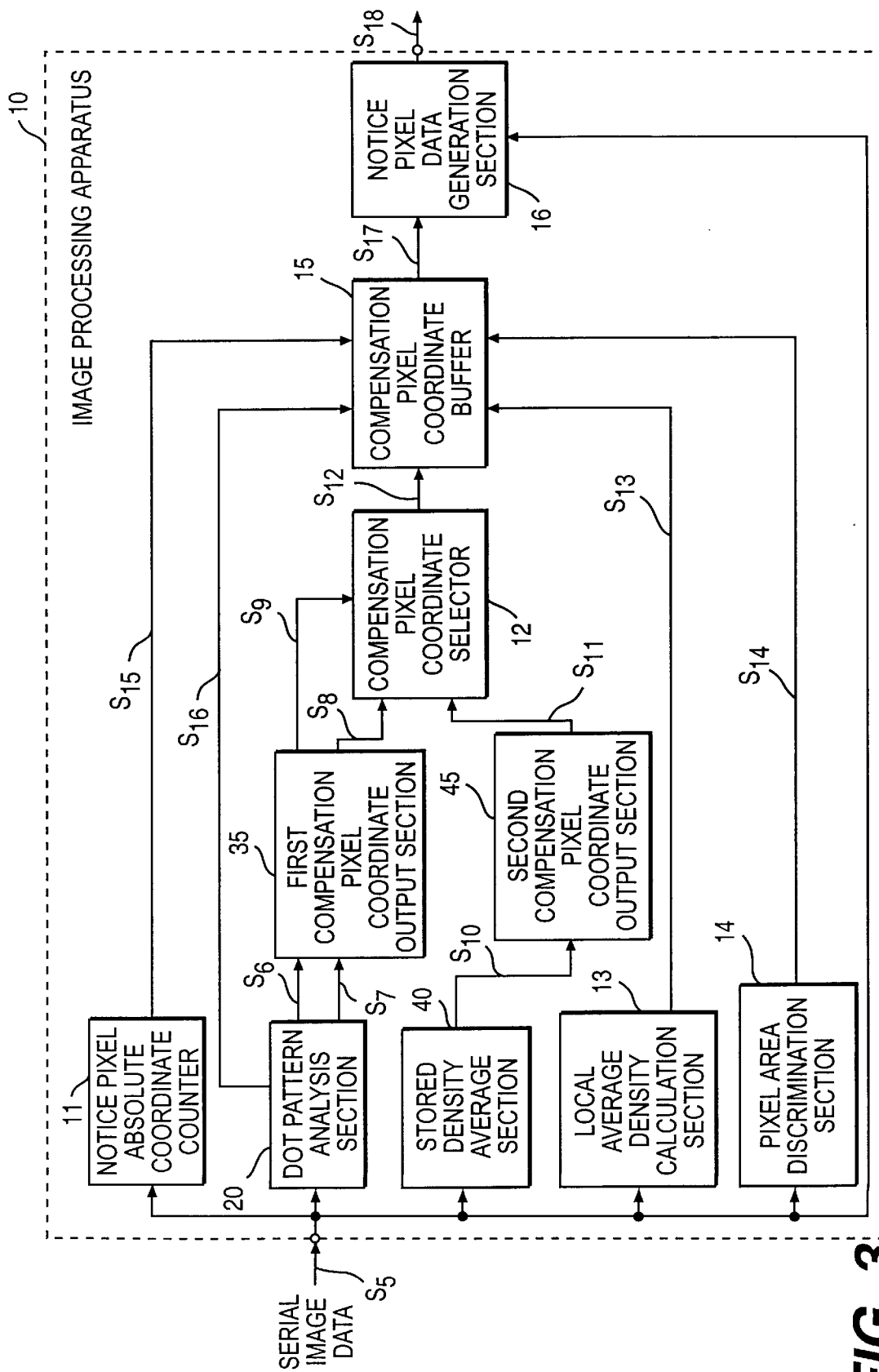
FIG. 3 is a block diagram of the image processing apparatus according to a second embodiment of the present invention.

FIG. 1 is a block diagram of the image processing apparatus according to the first embodiment of the present invention. This image processing apparatus converts a small gray-scale level image (the binary image) to a large gray-scale level image (the multivalued image) and outputs the large gray-scale level image. As shown in FIG. 1, the image processing apparatus is comprised of a window forming • notice pixel coordinate output section 1, a most closest pixel coordinate output section 2, a next closest pixel coordinate output section 3, a compensation pixel coordinate output section 4, a compensation pixel multivalved section 5, a notice pixel multivalued section 6, a multivalued compensation pixel memory section 7, a multivalued pixel output section 8. The window forming notice pixel coordinate output section 1 forms a window consisted of a predetermined number of pixels along a main scanning direction and a sub scanning direction on the binary image (input image), determines predetermined positioned black pixel in the window as a notice pixel and outputs a coordinate S1 of the notice pixel. For example, the notice pixel is a left upper corner black pixel in the window, which is surrounded by eight white pixels in the binary image. The most closest pixel coordinate output section 2 determines one black pixel closest to the notice pixel in the window as the most closest pixel and outputs a coordinate S2 of the most closest pixel. The next closest pixel coordinate output section 3 determines anothr black pixel closest to the notice pixel except for the most closest pixel as the next closest pixel in the window based on the coordinates S1, S2 and outputs a coordinate S3 of the next closest pixel. The compensation pixel coordinate output section 4 determines one white pixel located at a center in a triangle whose three peaks are the notice pixel, the most closest pixel, the next closest pixel as the compensation pixel based on the coordinates S1, S2, S3 and outputs a coordinate S4 of the compensation pixel. The compensation pixel multivalued section 5 converts the white pixel of the compensation pixel to a multivalued half tone pixel. The notice pixel multivalued section 6 converts the black pixel of the notice pixel to a multivalued half tone pixel based on the coordinate S1 of the notice pixel and the coordinate S4 of the compensation pixel. The multivalued compensation pixel memory section 7 orderly stores the multivalued half tone pixel and the coordinate of the compensation pixel outputted by the compenssation pixel multivalued section 5. The multivalved pixel output section 8 inputs the multivalued half tone pixel of the notice pixel outputted by the notice pixel multivalued section 6 and the multivalued half tone pixel of the compensation pixel stored in the multivalued compensation pixel memory section 7, and outputs the multivalued half tone pixels of the notice pixel and the compensation pixel at the same time. The basic construction in FIG. 1 is effective to realize the image processing apparatus of the present invention by using a software.

Next, the image processing apparatus of a second embodiment of the present invention will be explained by referring to FIG. 2 and 3. The second embodiment includes more concrete construction in comparison with basic construction of the first embodiment. FIG. 2A shows an example of density pattern of a binary error-diffusion image. The binary error-diffusion image represent light and shade by distributing black pixels on white plane. But the user often receives the noise feeling from the distributed black pixels. Furthermore, the black pixels often arranges on a straight line (L1 in FIG. 2A) and this straight line forms as the snake-like noise. However, in the present invention, as shown in FIG. 2B, the notice pixel P1 as a left-upper corner black pixel in window WI is converted to a half dot (a multivalued half tone pixel). The notice pixel P1 needs to be an isolated black pixel surrounded by eight white pixels. A density of the half dot of the notice pixel P1 may be uniformly 0.5 (½ of the black pixel (1.0)) or may be determined by density pattern (density average) of all pixels in the window W1. This half dot is not conspicious for the user's eye. Then, two black pixels P2 and P3 except for the notice pixel P1 are extracted from the window W1 (This extraction method of the black pixels P2 and P3 is explained afterwards by referring to FIG. 6.). A white pixel P4 located at a center in a triangle whose three peaks are P1, P2, P3 is extracted as a compensation pixel and converted to a half dot. A density of the half dot of the compensation pixel P4 may be uniformly 0.5 (½ of the black pixel) or may be determined by a difference of the density value between the black pixel (unconverted notice pixel) and the half dot of the notice pixel P1 (converted notice pixel). While the window is shifted by unit of one pixel along a main scaning direction and a sub scaning direction, the above processing is repeated for each window on the binary image. As a result, as shown in FIG. 2C, unconspicious half dot pixels are distributed on the image and the bonds noise is reduced.

Furthermore, as shown in FIG. 2D, if the black pixels except for the notice pixel P1 do not exist in the window W1, a density average of all pixels in a larger area W2 including the window W1 is calculated. A black pixel P5 outside the window W1 is determined by the density average and converted to the half dot as shown in FIG. 2E. As a result, as shown in FIG. 2F, the rough feeling can be reduced in high-light image including a few black pixels.

Figure 4:
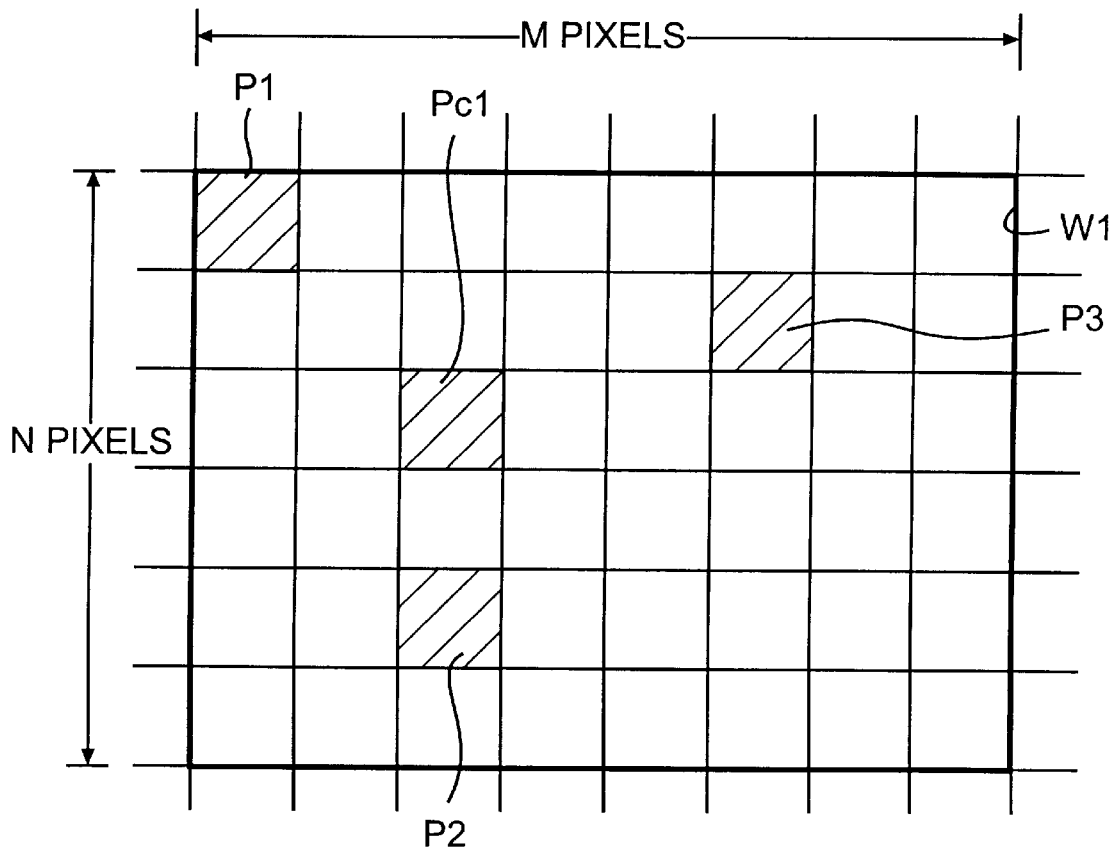
FIG. 4 is a schematic diagram of processing content of a dot pattern analysis section in the image processing apparatus in FIG. 3.

FIG. 3 is a block diagram of the image processing apparatus according to the second embodiment of the present invention. As shown in FIG. 3, the image processing apparatus 10 is comprised of a notice pixel absolute coordinate counter 11, a dot pattern analysis section 20, a first compensation pixel coordinate output section 35, a stored density average section 40, a second compensation pixel coordinate output section 45, a compensation pixel coordinate selector 12, a local average density calculation section 13, a pixel area discrimination section 14, a compensation pixel coordinate buffer 15, a notice pixel data generation section 16. A serial image data S5 of the binary image is inputted and a serial image data S18 of the multivalued image is outputted. The notice pixel absolute coordinate counter 11 counts a transfer clock of the serial image data S5, calculates position of each serial image data S5 in the binary image as a notice pixel absolute coordinate S15 and outputs the notice pixel absolute coordinate S15 to the compensation pixel coordinate buffer 15. The dot pattern analysis section 20 forms the window W1 of "M×N" pixels consisted of M pixels along a main scanning direction and N pixels along a sub scanning direction as shown in FIG. 4. The notice pixel P1 is left-upper corner pixel in the window W1. The dot pattern analysis section 20 extracts two black pixels closest to the notice pixel P1, as the first neighboring black pixel P2 and the second neighboring black pixel P3, and outputs each coordinate value signal S6, S7. If the notice pixel P1 is a black pixel, the compensation pixel generation signal S16 is outputted to the compensation pixel coordinate buffer 15. The first compensation pixel coordinate output section 35 calculates a first compensation pixel coordinate S8 based on the first neighboring black pixel coordinate S6 and the second neighboring black pixel coordinate S7, and outputs the first compensation pixel coordinate S8. As shown in FIG. 4, the first compensation pixel coordinate S8 is a relative coordinate of a center pixel (first compensation pixel PC1) of a triangle whose three peaks are the notice pixel P1, the first neighboring black pixel P2, the second neighboring black pixel P3 in the window W1. The stored density average section 40 calculates a density average S10 in a larger area W2 including the window W1 based on the serial image data S5 and outputs the density average S10. The second compensation pixel coordinate output section 45 calculates a second compensation pixel coordinate S11, which is a relative coordinate as an origin of the notice pixel P1, according to the density average S10 and outputs the second compensation pixel coordinate S11. The smaller the density average is, the larger the distance between the notice pixel P1 and the second compensation pixel coordinate S11 is. This relation will be explained afterwards. The compensation pixel coordinate selector 12 selects one of the first compensation pixel coordinate S8 and the second compensation pixel coordinate S11. If the first compensation pixel coordinate S8 is zero, i.e., if the black pixels except for the notice pixel P1 do not exist in the window W1, the second compensation pixel coordinate S11 is selected as the compensation pixel coordinate S12. In other cases, the first compensation pixel coordinate S8 is selected as the compensation pixel coordinate S12. The compensation pixel coordinate buffer 15 converts the compensation pixel coordinate S12 to a compensation pixel absolute coordinate by the notice pixel absolute coordinate S15, and orderly stores the compensation pixel absolute coordinate in response to a timing of the compensation pixel generation signal. If a compensation pixel suppress signals S13, S14 are outputted by the local average density calculation section 13 and the pixel area discrimination section 14 (explained afterwards), the compensation pixel absolute coordinate is not stored. If the compensation pixel absolute coorinate is stored, the compensation pixel coordinate buffer 15 outputs a half dot signal S17. In this case, the compensation pixel coordinate buffer 15 compares the notice pixel absolute coordinate S15 (orderly outputted from the notice pixel absolute coordinate counter 11 by count up) with each of the stored compensation pixel absolute coordinate, and outputs the half dot signal S17 in case the notice pixel absolute coordinate S15 coincide with one of the stored compensation pixel absolute coordinate. The notice pixel data generation section 16 outputs a half dot density as the serial output image data S18 in case of receiving the half dot signal S17. In other words, the serial image data S15 is outputted as the serial output image data S18. The local average density calculation section 13 calculates a local density average of all pixels in a local area as a center of the notice pixel P1, and outputs the compensation pixel suppress signal S13 if the local density average is above a threshold. The pixel area discrimination section 14 decides whether the notice pixel P1 belongs to a character area or a photo image area by referring to the local area, and outputs the compensation pixel supperss signal S14 if the notice pixel P1 belongs to the character area.

Figure 5:
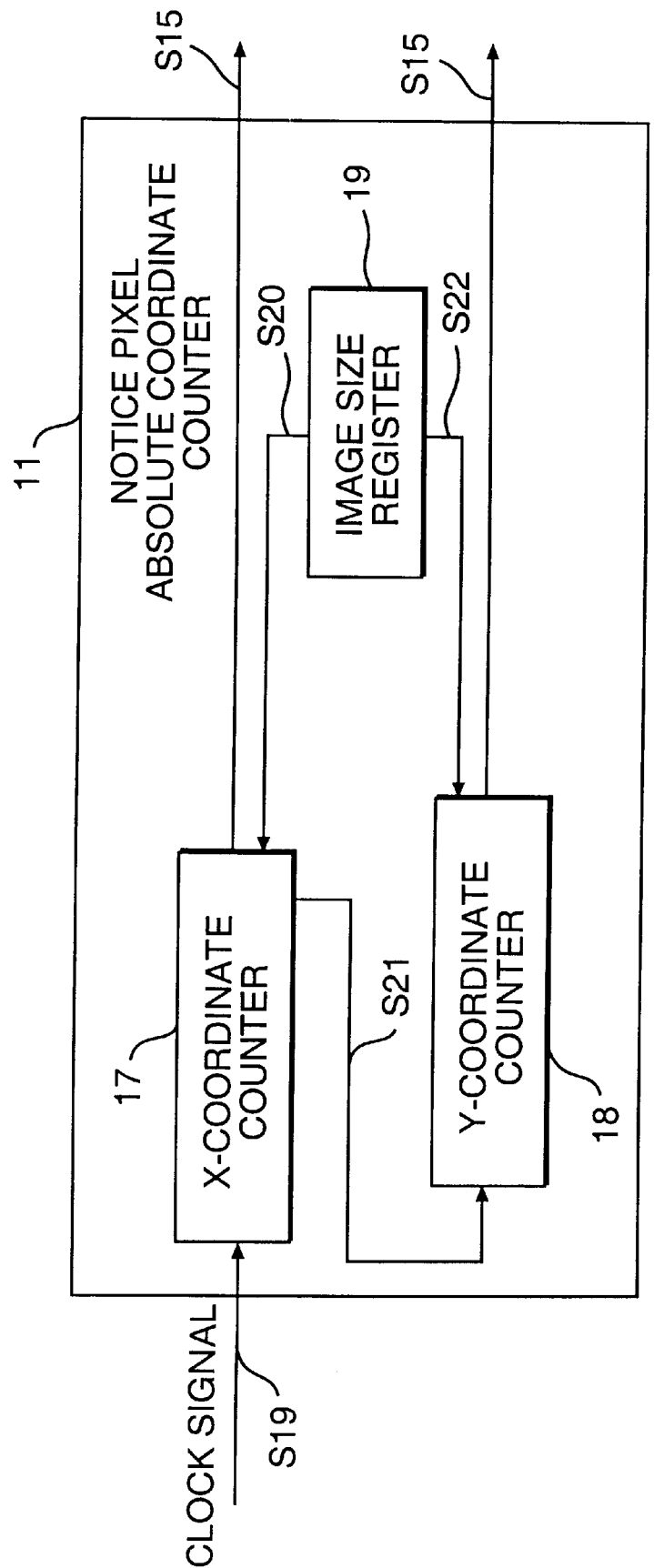
FIG. 5 is a block diagram of a notice pixel absolute coordinate counter in the image processing apparatus in FIG. 3.

FIG. 5 is a block diagram of the notice pixel absolute coordinate counter 11. The notice pixel absolute coordinate counter 11 is comprised of a X-coordinate counter 17, a Y-coordinate counter 18, an image size register 19. The X-coordinate counter 17 counts the transfer clock of the serial image data S5 as a stroke signal S19. When a counted value reaches to a main scanning image size S20 stored in the image size register S20, the counted value is reset and outputs a stroke signal S21 to the Y-coordinate counter 18. When a counted value of the Y-coordinate counter 18 reaches to a sub scanning image size S22 stored in the image size register 19, the counted value 15 reset. The counted values in the X-coordinate counter 17 and the Y-coordinate counter 18 are outputted to the compensation pixel coordinate buffer 15 as the notice pixel absolute coordinate S15.

Figure 6:
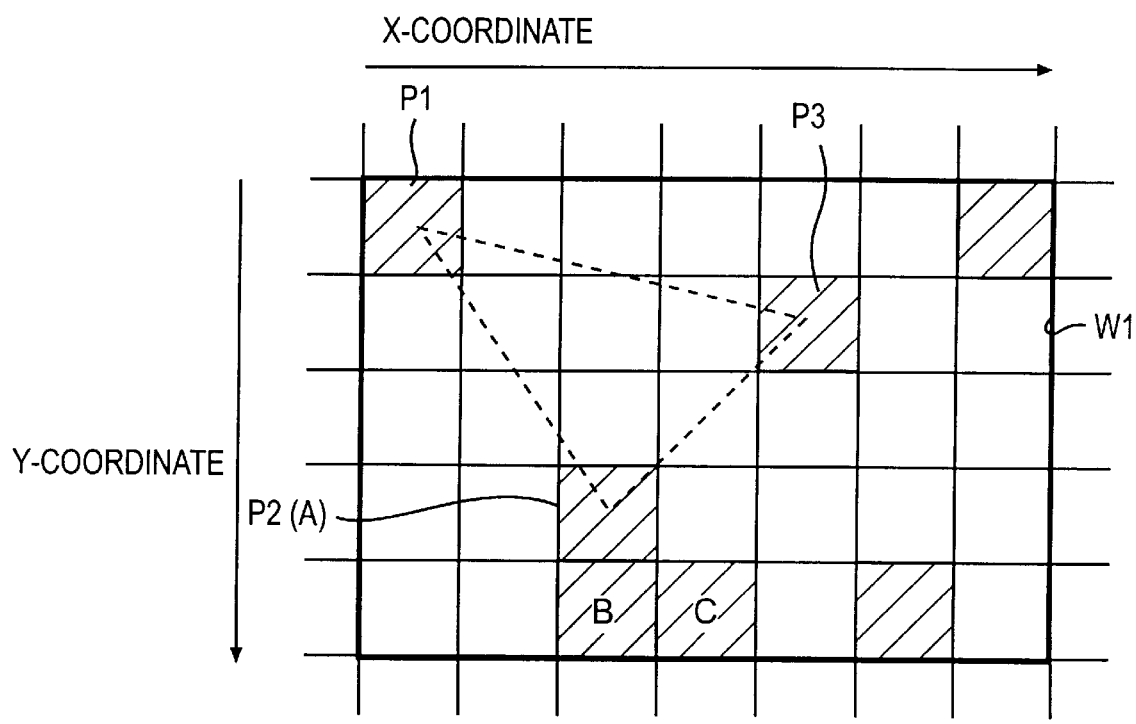
FIG. 6 is a schematic diagram of processed image of the dot pattern analysis section in the image processing apparatus in FIG. 3.

FIG. 6 is a schematic diagram of processing content of the dot pattern analysis section 20. The dot pattern analysis section 20 selects the first neighboring black pixel P2 and the second neighboring black pixel P3 from the window WI. In case the main scanning direction is X-axis and the sub scanning direction is Y-axis as the origin of the notice pixel P1, the first neighboring black pixel P2 is a black pixel whose X-coordinate value is smallest except for the notice pixel P1 in the window W1. If a plurality of black pixels whose X-coordinate value is smallest exist in the window WI, one black pixel whose Y-coordinate value is smallest (a pixel A in FIG. 6) is selected as the first neighboring black pixel P2. The second neighboring black pixel P3 is one black pixel whose Y-coordinate value is smaller than the Y-coordinate value of the first neighboring black pixel P2 and whose X-coordinate value is smallest except for the first neighboring black pixel P2. By setting a condition of the first neughboring black P2 and the second neighboring black pixel P3 as mentioned-above, if the black pixels are uniformly distributed on the binary image, the notice pixel P1, the first neighboring black pixel P2 and the second neighboring black pixel P3 form a triangle similar to an equilateral triangle. Therefore, if the first compensation pixel PC1 is positioned at a center of the triangle, distribution of compensated pixel is impartial on the image and the texture is uniform.

Figure 7:
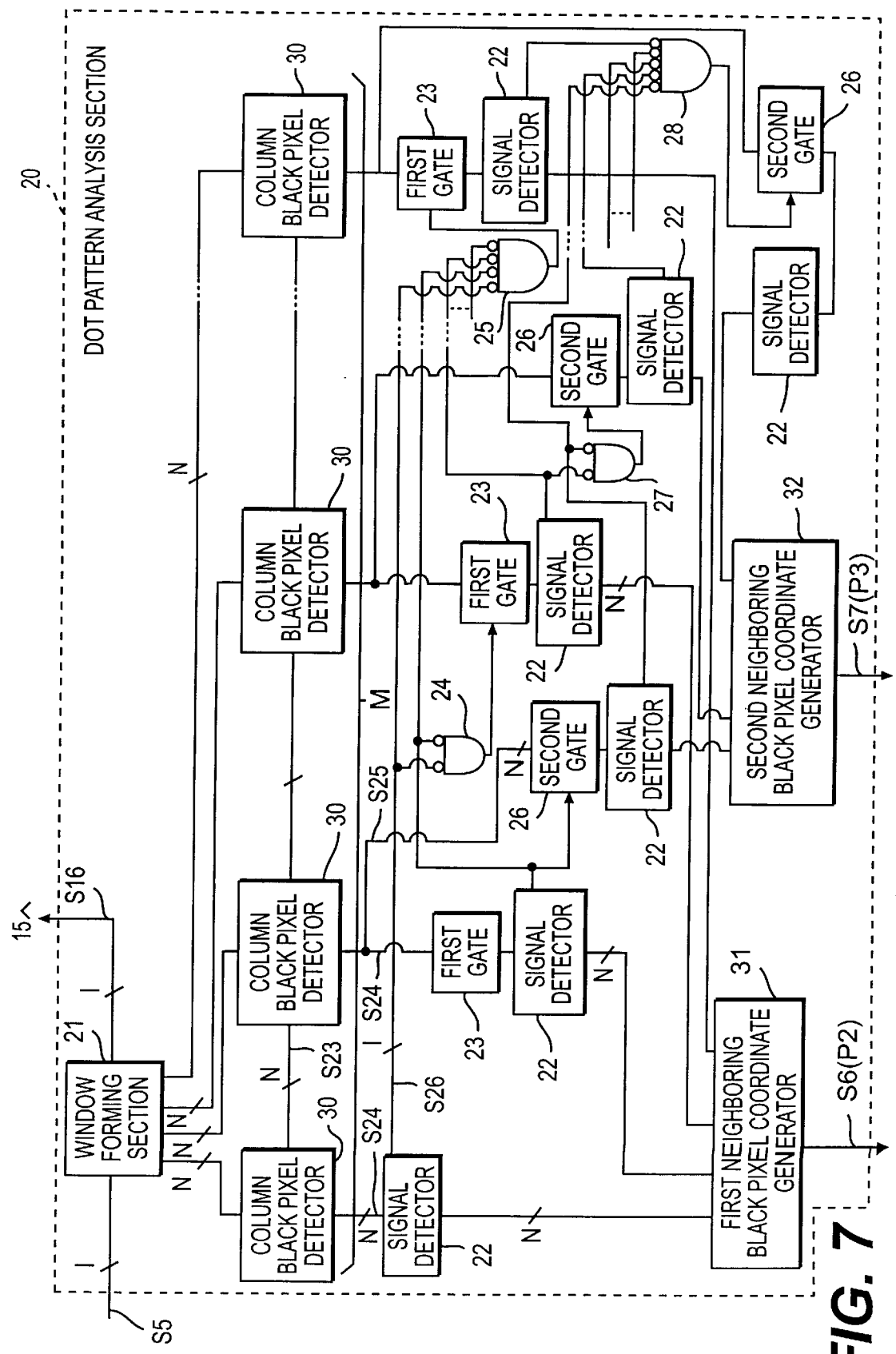
FIG. 7 is a block diagram of the dot pattern analysis section in the image processing apparatus in FIG. 3.

FIG. 7 is a block diagram of the dot pattern analysis section 20. The dot pattern analysis section 20 includes an window forming section 21 and M units of column black pixel detecter 30. The window forming section 21 forms an window W1, of "M×N" pixels based on the serial pixel data S5. In this case, the notice pixel P1 is positioned at left-upper corner pixel in the window W1. If the notice pixel P1 is a black pixel, the compensation pixel generation signal S16 is outputted. The column black pixel detector 30 inputs N pixels of corresponding column in the window WI. The most left side-column black pixel detector 30 inputs N pixels of the most left side column in the window W1. As mentioned-above, y-coordinate of the second neighboring black pixel P3 is smaller than that of the first neighboring black pixel P2. In short, if a coordinate (i,j) of the black pixel is selected as the first neighboring black pixel P2, a pixel whose y-coordinate is larger than j must not be selected as the second neighboring black pixel P3. A line suppress signal S23 executes this function. N lines of output signal from each column black pixel detector 30 is divided into two. One is a candidate signal S24 of the first neighboring black pixel coordinate S6, and the other is a candidate signal S25 of the second neighboring black pixel coordinate S7. The signal detector 22 detects whether the candidate signal is zero. This detection signal is column suppress signal S26 as a gate signal of a first gate 23 and a second gate 26 in order to suppress output of the column black pixel detector 30 located at right side from each signal detector 22. In short, even if one black pixel is detected as the first neighboring black pixel P2, another black pixel whose X-coordinate is larger than the one black pixel is not doubly detected as the first neighboring black pixel P2.

Figure 8:
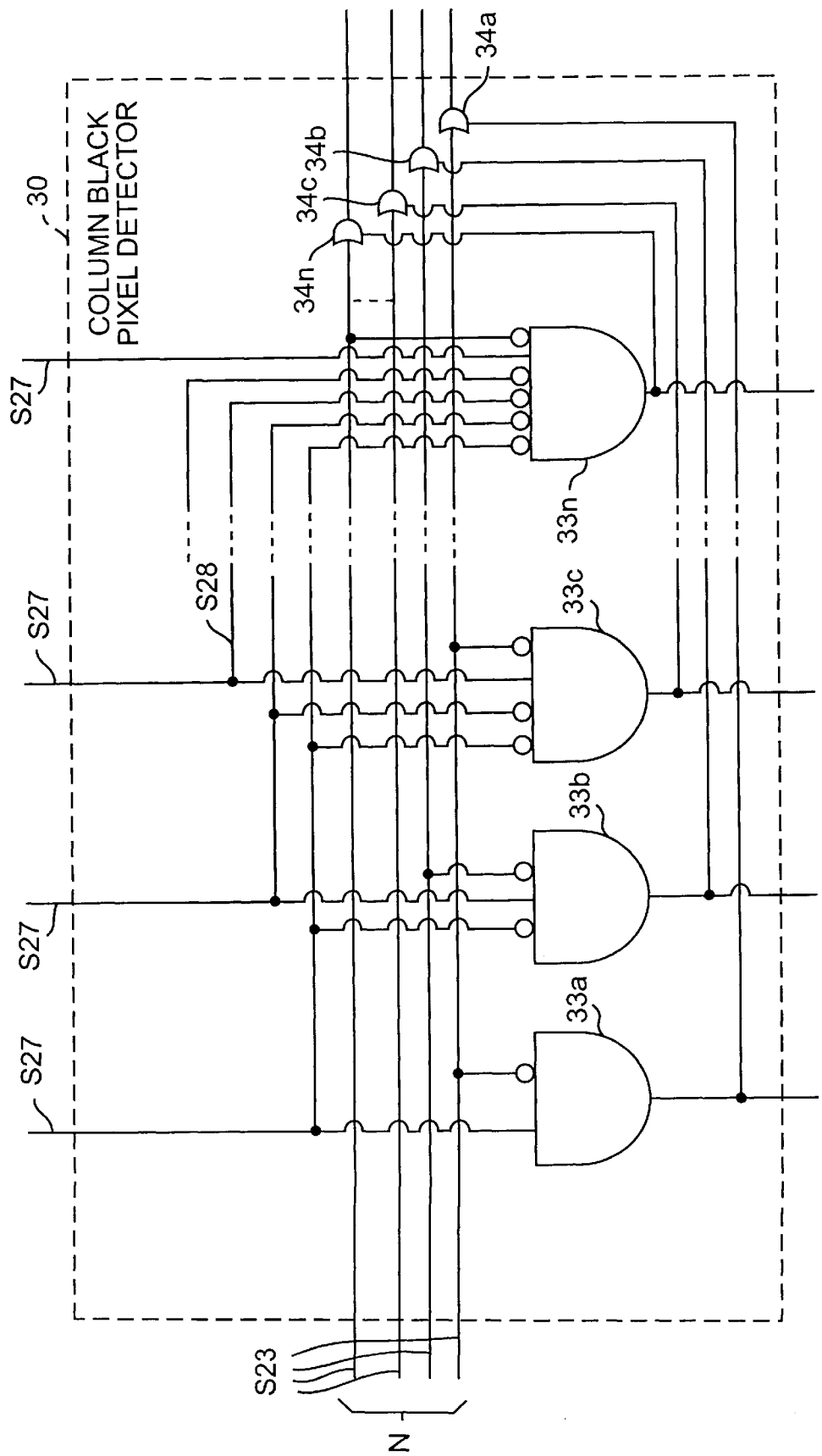
FIG. 8 is a block diagram of a column black pixel detection section in the image processing apparatus in FIG. 3.

FIG. 8 is a block diagram of the column black pixel detector 30. The column black pixel detector 30 inputs N pixels data S27 of corresponding column of the window W1 and N lines of suppress signal S23. The N pixels data S27 corresponds to each pixel (i,0)~(i,N−1) on each column in the window W1. The N lines of the suppress signal S23 corresponds to each column in the window W1. If the pixel (x1,y1) is selected as the first neighboring black pixel P2, the line suppress signal S23 suppresses the black pixel signal whose y-coordinate is not smaller than y1 in order to select the second neighboring black pixel P3 whose y-coordinate is smaller than y1. Furthermore, in order to select the black pixel whose y-coordinate is smallest on same column, a column suppress signal S28 suppresses the black pixel signal whose y-coordinate is larger on the same column.

Return to FIG. 3, the first compensation pixel coordinate output section 35 calculates the first compensation pixel coordinate S8 based on the first neighboring black pixel coordinate S6 and the second neighboring black pixel coordinate S7. Assume that the notice pixel coordinate (P1) is (0,0), the first neighboring black pixel coordinate S6(P2) is (x1,y1), the second neighboring black pixel coordinate S7(P3) is (x2,y2), the first compensation pixel coordinate S8(PC1) is (X1,Y1).

(i) In case of "(x2, y2)=(0, 0)" (In case the second neighboring black pixel S7 does not exist in the window)

$x1 \geq y1 \ldots X1=x1/2, Y1=N$ other cases $\ldots X1=M, Y1=y1/2$ (ii) In case of "x2≠0 or y2≠0" (In case the second neighboring black pixel S7 exists in the window)

$X1=x2/2, Y1=y1/2$

By using above equation, the first compensation pixel coordinate S8 is calculated as a center point in the triangle consisted of the notice pixel, the first neighboring black pixel and the second neighboring black pixel.

Figure 9:
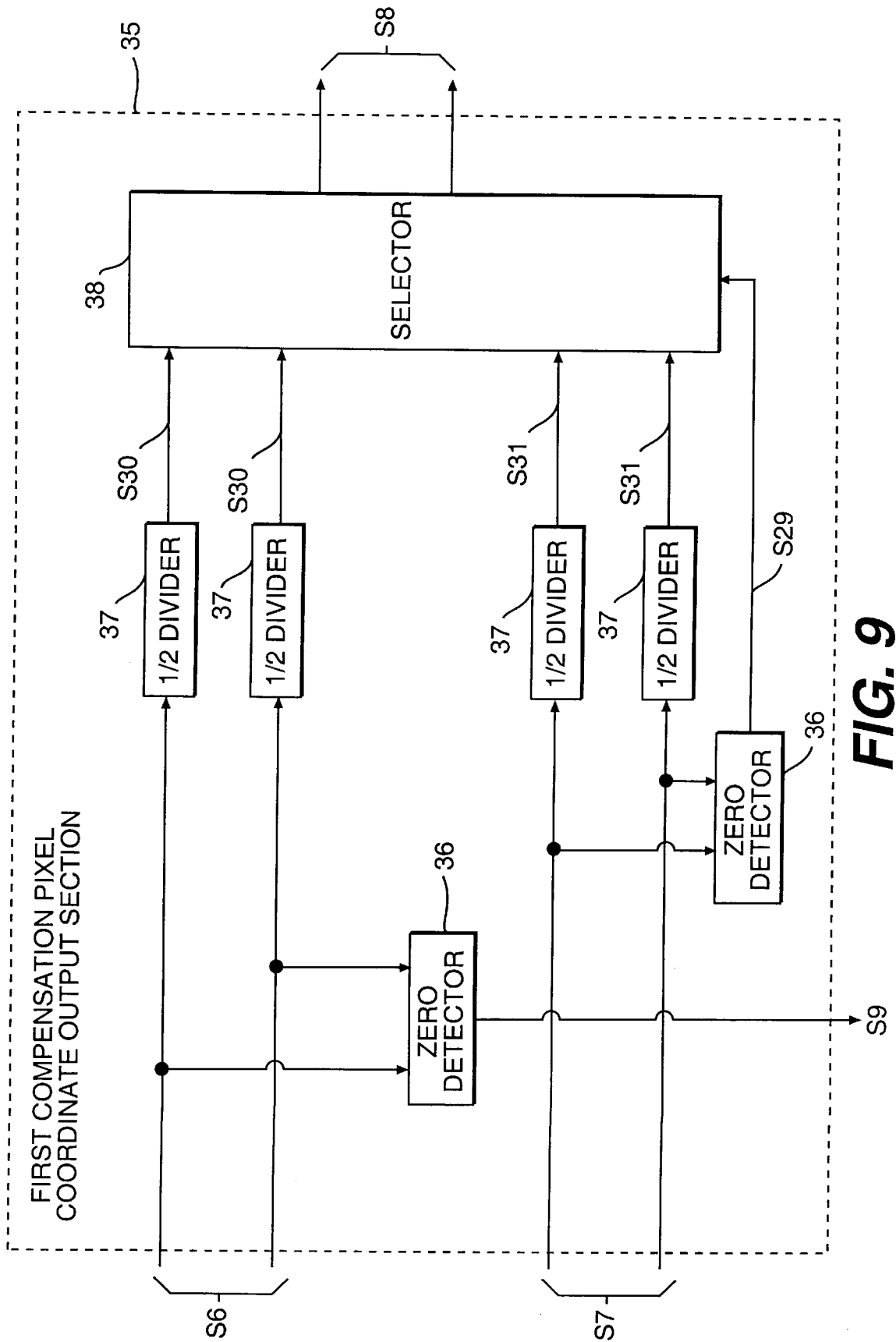
FIG. 9 is a block diagram of a first compensation pixel coordinate output section in the image processing apparatus in FIG. 3.

FIG. 9 is a block diagram of the first compensation pixel coordinate section 35. The first compensation pixel coordinate section 35 is comprised of a zero detector 36, ½ divider 37, a selector 38. The zero detector decides whether the first neighboring black pixel coordinate S6 and the second neighboring black pixel coordinate S7 are "0". In case of "zero", zero detection signal S9 or S29 is outputted. The ½ divider 37 multiplies "½" to (x,y) coordinates of the first neighboring black pixel coordinate S6 and the second neighboring black pixel coordinate S7, and outputs (x,y) cordinate candidate S30, S31 of the first compensation pixel coordinate. The selector 38 selects X-coordinate and y-coordinate from the (x,y) coordinate candidate S30, S31 based on the zero detection signal S29 and outputs the selected (x,y) coordinate as the first compensation pixel coordinate S8.

Figure 10:
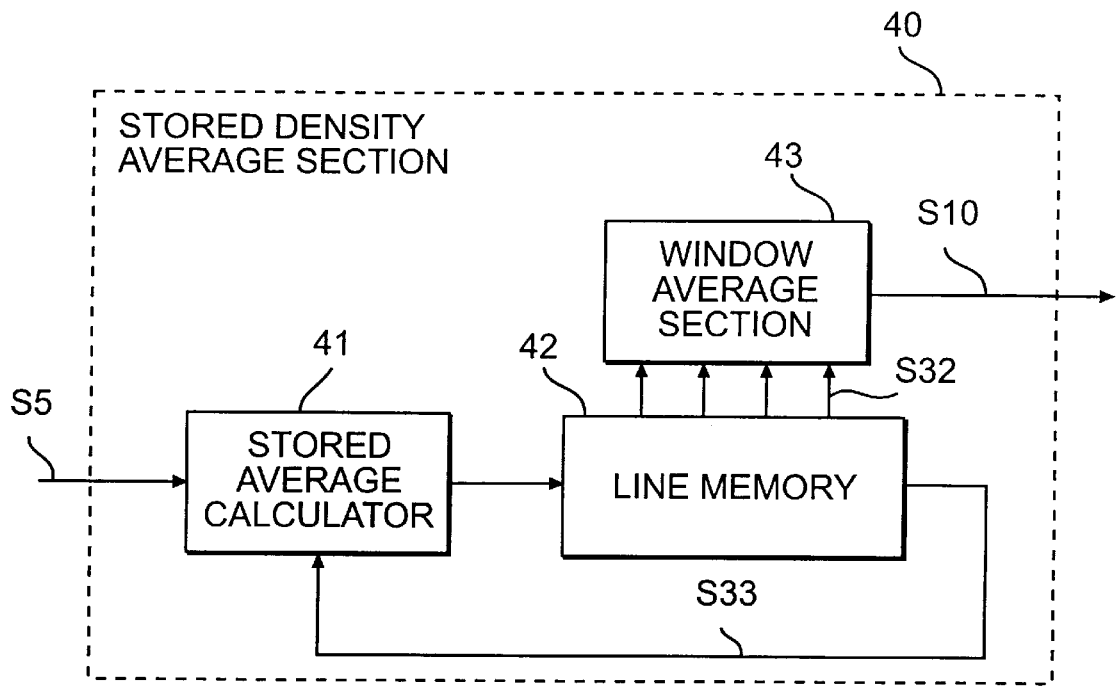
FIG. 10 is a block diagram of a stored density average section in the image processing apparatus in FIG. 3.

FIG. 10 is a block diagram of the stored density average section 40. A function of the stored density average section 40 is calculation of the compensation pixel position outside the window W1 in case the first neighboring black pixel S6 and the second neighboring black pixel S7 do not exist in the window W1. The stored density avevage section 40 is comprised of a stored average calculator 41, a line memory 42, a window average section 43. The line memory 42 is a shift register to store the line density average D(x) S32 per a pixel of one line on the main scanning direction (X axis direction). Assume that density value d(x0,y0) of the pixel (x0,y0) is transferred to the stored density average section 40 as the serial image data S5. At this timing, the line memory 42 already stores the line density average {D(X0), D(X0+1), D(X0+2), . . . , D(XW−1), D(XW), D(0), D(1), D(2), . . . , D(X0−2), D(X0−1)} by order from a head address. (XW= image size along the main scanning direction). The stored average calculator 41 inputs D(X0) S33 stored at the head address of the line memory 42 and d(x,y) of the serial image data S5, and calculates D(X) as follows.

$D(X)=\{D(X)*(Wy-1)+d(x,y)\}/wy$

By this calculation, density of past Wy lines, ie., the line density average D(X) S32, is averaged.

The window average section 43 additionally averages the line density average D(X) S32 as for following range of X.

$X0-WX/2 \sim X0+WX$

In this way, the density average S10 is calculated and outputted to the second compensation pixel coordinate output section 45. As a result, the density average S10 of the area "Wx×Wy" including the notice pixel.

Figure 11:
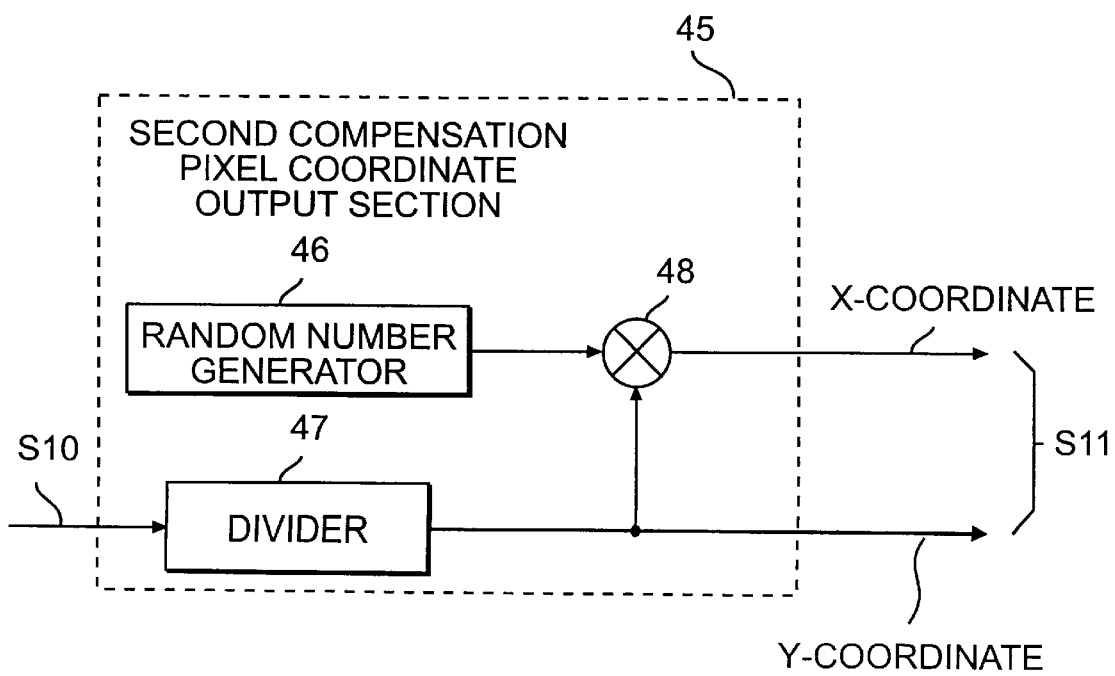
FIG. 11 is a second compensation pixel coordinate output section in the image processing apparatus in FIG. 3.

FIG. 11 is a block diagram of the second compensation pixel coordinate output section 45. A function of the second compensation pixel coordinate output section 45 is calculation of the second compensation pixel coordinate S11 from the density average S10. The second compensation pixel coordinate output section 45 is comprised of a random number generator 46, a divider 47, a multiplication circuit 48. A relation between the density average (=D) S10 and the second compensation pixel coordinate (X2, Y2) S11 is represented as follows.

$$(X2,Y2)=(\text{rand}(K1)*L,L)$$

$$L=K2/D$$

rand(K1): random number (0-K1), K1,K2: coefficient
The divider 47 calculates "L" and outputs as y-coordinate of the second compensation pixel coordinate S11. The random number generator 46 generates the random number "rand (K1)" as a coefficent of the main scanning direction. The multiplication circuit 48 multiplies "rand(K1)" by "L" and outputs as x-coordinate of the second compensation pixel coordinate S11. In the second compensation pixel coordinate output section 45, the compensation pixel position of the main scanning direction is determined by the randam number. Therefore, the bonds texture, which the compensation dots are arranged along predetermined direction, does not appear in the image.

Figure 12:
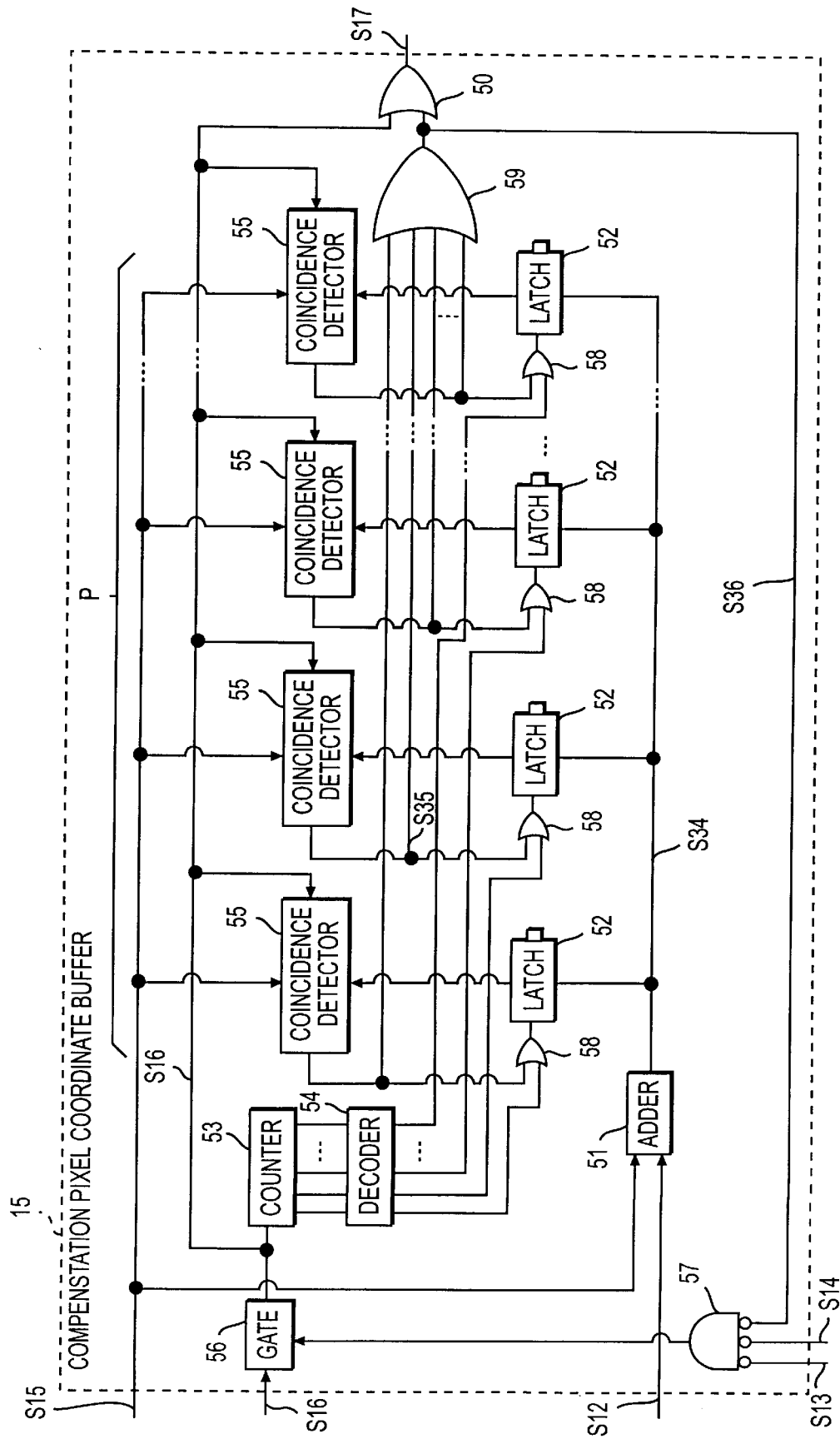
FIG. 12 is a block diagram of a compensation pixel coordinate buffer in the image processing apparatus in FIG. 3.

FIG. 12 is a block diagram of the compensation pixel coordinate buffer 15. The compensation pixel coordinate buffer 15 is comprised of an adder 51 to calculate the compensation pixel absolute coordinate S34 by adding the compensation pixel relative coordinate S12 and the notice pixel absoluute coordinate S15, P units of latch to store the compensation pixel absolute coordinate S34, a counter 53 and a decoder 54 to select one latch 52 to store the compensation pixel absolute coordinate S34, a coincidence detector 55 to detect a coincidence between the notice pixel absolute coordinate S15 and the compensation pixel absolute coordinate S34 stored in the latch 52.

First, the counter 53 counts up the compensation pixel generation signal S16 outputted by the dot pattern analysis section 20. The compensation pixel generation signal S16 passed through the gate 56 is suppressed by output signal from the NAND gate 57 to calculate NAND of the compensation pixel supperss signals S13, S14, logical sum output S36. The output of the counter 53 is decoded by the decoder 54. Output signal of the decoder 54 and output signal S35 of the coincidence detector 55 are connected to each latch 52 though OR gate 58 as each enable signal. A logical sum S36 of the coinsidence signal S58 is outputted from OR gate 59. Assume that the compensation pixel coordinate S12 is firstly inputted from the compensation pixel coordinate selector 12. At this timing, the counter 53 updates an intial value "0" to "1". Therefore, an enable signal to a first latch 52 is only "High". In this case, the compensation pixel coordinate S12 is converted to the compensation pixel absolute coordinate S34 by the adder 51 and stored in the first latch 52. Assume that the compensation pixel coordinate S12 is secondly inputted. At this timing, the counter 53 updates the count value from "1" to "2". In this case, an enable signal to a second latch 52 is only "High" and the compensation pixel coordinate S12 is stored in the second latch 52. In parallel with this activation, the coincidence detector 55 compares the notice pixel absolute coordinate S15 with the compensation pixel absolute coordinate S34 stored in each latch 52. In case the notice pixel absolute coordinate S35 coincides with the compensation pixel absolute coordinate S34 stored in one latch 52, the coincidence detector 55 corresponding to the one latch 52 outputs the coincidence signal S53. This coincidence signal S53 passes through OR gate 59 and AND gate 57, and outputted to the counter 53 through the gate 56 as a negation signal. The negation signal suppresses count up of the counter 53. On the other hand, the coincidence signal S53 from the coincidence detector 55 is feedbacked to the one latch 52 through the OR gate 58. The one latch 52 becomes to be enabled. Therefore, new compensation pixel absolute coordinate S34 can be overwritten in the one latch 52 and small number of the latch 52 is effectively used. The coincidence detector 55 continuously outputs the coincidence signal S35 till reset signal is received. After the counter 53 counts up at P times, the count up is not further executed. Hereafter, in case the notice pixel absolute coordinate S15 coincides with the compensation pixel absolute coordinate S34 stored in one latch 52, next compensation pixel absolute coordinate S34 is stored in the one latch 52. Logical sum signal S36 of the coincidence signal S35 is added to the compensation pixel generation signal S16 as a logical sum by OR gate 50 and outputted as a half dot signal S17. The OR gate 50 includes following two cases as output condition of the half dot signal.

(1) The notice pixel P1 is a black pixel.
(2) The notice pixel P1 is a white pixel and the compensation pixel.

Return to FIG. 3, when the notice pixel data generation section 16 receives the half dot signal S17, a half dot density is outputted as the serial output image data S18. In other cases, the serial image data S5 is outputted as the serial output image data S18. The local average density calculation section 13 counts number of black pixels in the window W1 and outputs the compensation pixel suppress signal S13 in case the count value is above a threshold. The pixel area discrimination section 14 decides whether the notice pixel P1 belongs to a character area or an image area, and outputs the compensation pixel suppress signal S14 if the notice pixel P1 belongs to the character area.

In the above-mentioned embodiment, the input image data is the binary image, but may be the multivalued image. For example, in case the density of the notice pixel is n/N (n:arbitrary integral number, N:multivalue number), two neighboring black pixels whose density is n/N are extracted from the window. In a triangle whose three peaks are the notice pixel and the two neighboring black pixels, the density of all pixels in the triangle must be (n−1)/N as a condition. In this case, one pixel located at center in the triangle is extracted as the compensation pixel. The density of the notice pixel is converted to a half-dot (For example, (2n−1)/2N) and the density of the compensation pixel is converted to the half-dot. This processing is executed whenever the window is shifted by unit of one pixel along the main scaning direction and the subscaning direction on the multivalued image. As a result, the isolated pixel of the density "n/N" in area of the density "(n−1)/N" is unconspicious for the user's watching.

Figure 13:
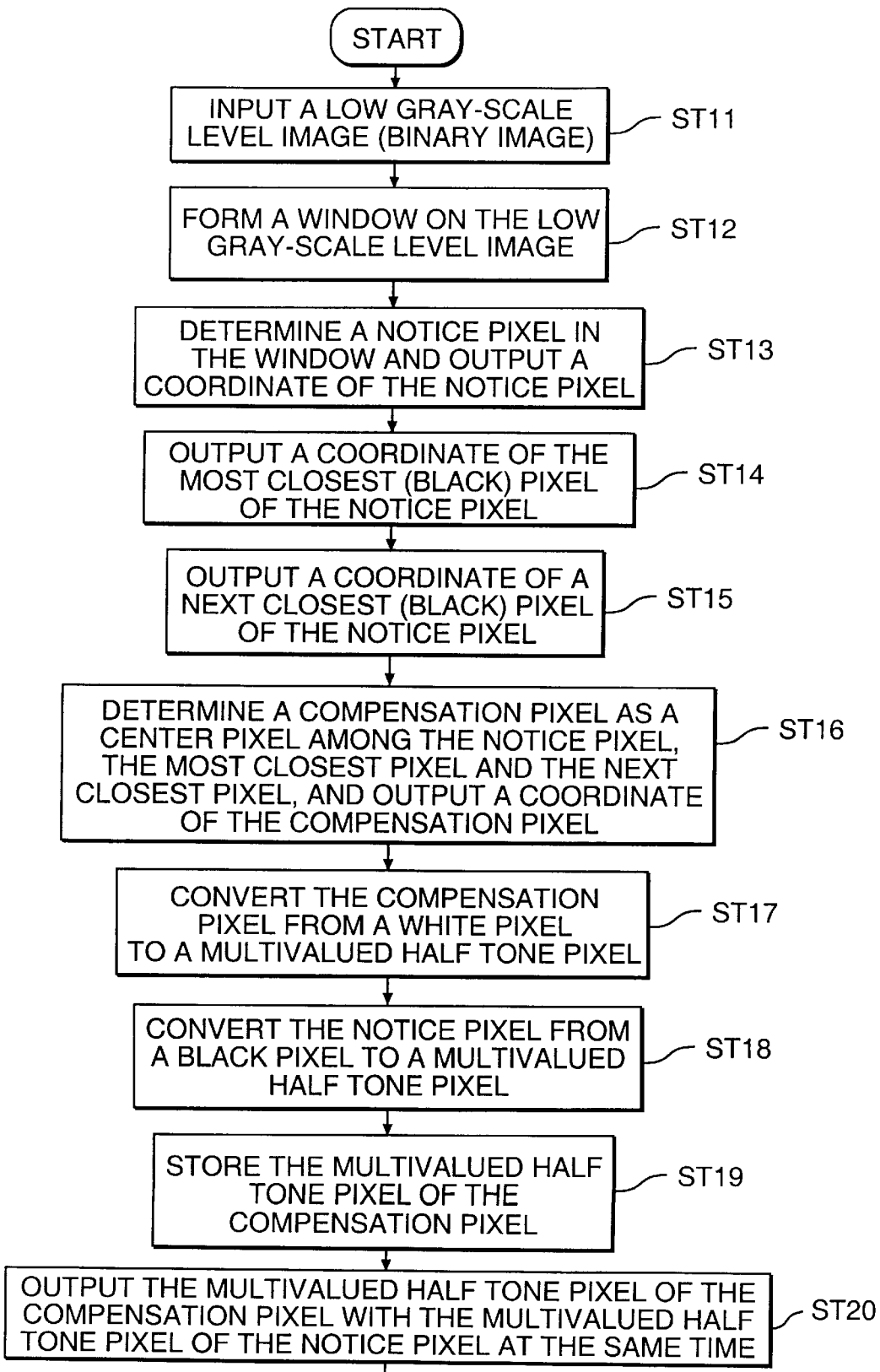
FIG. 13 is a flow chart of the image processing method according to the present invention.

FIG. 13 is a flow chart of the image processing method according to the present invention. First, a low gray-scale level image (the binary image) is inputted (ST11). A window consisted of a predetermined number along the main scanning direction and the sub scaning direction is formed in the window (ST12). A black pixel located at predetermined position in the window is determined as the notice pixel and a coordinate of the notice pixel is outputted (ST13). A black pixel closest to the notice pixel is determined as the most closest pixel and a coordinate of the most closest pixel is outputted (ST14). A black pixel closest to the notice pixel except for the most closest pixel is determined as the next closest pixel and a coordinate of the next closest pixel is outputted (ST15). A white pixel located at a center position in a triangle whose three peaks are the notice pixel, the most closest pixel and the next closest pixel is determined as the compensation pixel and a coordinate of the compensation pixel is outputted (ST16). The white pixel of the compensation pixel is converted to the multivalued half tone pixel (ST17). The black pixel of the notice pixel is converted to the multivalued half tone pixel (ST18). The multivalued half tone pixel of the compensation pixel is stored in order (ST19). The multivalued half tone pixel of the notice pixel and the multivalued half tone pixel of the compensation pixel stored are outputted at the same time (ST20).

A memory can be used to store instructions for performing the process described in FIG. 13, such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An image processing apparatus for outputting a multivalued image converted from a binary image, comprising:
    a window forming means for forming a window consisted of a predetermined number of pixels along a main scanning direction and a sub scanning direction on the binary image;
    a notice pixel coordinate output means for determining a predetermined positioned black pixel in the window as a notice pixel, and for outputting a coordinate of the notice pixel;
    a neighboring pixel coordinate output means for determining two black pixels neighboring the notice pixel in the window, and for outputting coordinates of the two black pixels;
    a compensation pixel coordinate output means for determining a center positioned white pixel among the notice pixel and the two black pixels in the window as a compensation pixel, and for outputting a coordinate of the compensation pixel;
    a notice pixel multivalued means for converting the black pixel of the notice pixel to a multivalued half tone pixel, and for outputting the multivalued half tone pixel based on the coordinate of the notice pixel; and
    a compensation pixel multivalued means for converting the white pixel of the compensation pixel to a multivalued half tone pixel, and for outputting the multivalued half tone pixel based on the coordinate of the compensation pixel.

2. The image processing apparatus according to claim 1, wherein said window forming means orderly forms the window by shifting one pixel along the main scanning direction and the sub scanning direction on the binary image, each window is processed in order.

3. The image processing apparatus according to claim 1, wherein said notice pixel coordinate output means determines a left upper corner pixel in the window as the notice pixel, the left upper corner pixel is an isolated black pixel surrounded by eight white pixels.

4. The image processing apparatus according to claim 1, wherein said neighboring pixel coordinate output means determines one black pixel closest to the notice pixel in the window as the most closest pixel, and determines another black pixel closest to the notice pixel except for the most closest pixel in the window as a next closest pixel.

5. The image processing apparatus according to claim 4, wherein said compensation pixel coordinate output means determines the compensation pixel as the white pixel of a center point in a triangle whose three peaks are the notice pixel, the most closest pixel, the next closest pixel.

6. The image processing apparatus according to claim 1, further comprising a stored density average means calculates an average of density of all pixels in a larger area including the window on the binary image.

7. The image processing apparatus according to claim 6, wherein said compensation pixel coordinate output means determines a second compensation pixel as one white pixel outside the window in the binary image based on the average, the smaller the average is, the larger a distance between the notice pixel and the compensation pixel is.

8. The image processing apparatus according to claim 7, further comprising a compensation pixel coordinate selection means selects the second compensation pixel instead of the compensation pixel of the center positioned white pixel if at least one black pixel except for the notice pixel does not exist in the window.

9. The image processing apparatus according to claim 1, further comprising a local average density calculation means calculates an average of density of pixels of a local area as a center of the notice pixel, wherein the coordinate of the compensation pixel is not outputted if the average is above a threshold value.

10. The image processing apparatus according to claim 1, further comprising a pixel area discrimination means decides whether the notice pixel belongs to a character area, wherein the coordinate of the compensation pixel is not outputted if the notice pixel is decided to belong to the character area.

11. The image processing apparatus according to claim 1, wherein said notice pixel multivalued means converts the black pixel of the notice pixel to the multivalued half tone pixel based on a density pattern of all pixels in the window.

12. The image processing apparatus according to claim 11, wherein said compensation pixel multivalued means converts the white pixel of the compensation pixel to the multivalued half tone pixel based on a difference of the density value between the black pixel of the notice pixel and the multivalued half tone pixel.

13. The image processing apparatus according to claim 1, further comprising a multivalued compensation pixel memory means orderly stores the multivalued half tone pixel outputted by said compensation pixel multivalued means in correspondence with the coordinate of the compensation pixel, wherein the multivalued half tone pixel of the compensation pixel is outputted with the multivalued half tone pixel of the notice pixel.

14. An image processing method for outputting a multivalued image converted from a binary image, comprising the steps of:

forming a window consisted of a predetermined number of pixels along a main scanning direction and a sub scanning direction on the binary image;

determining a predetermined positioned black pixel as a notice pixel in the window;

outputting a coordinate of the notice pixel;

determining two black pixels neighboring the notice pixel in the window;

outputting coordinates of the two black pixels;

determining a center positioned white pixel among the notice pixel and the two black pixels in the window as a compensation pixel;

outputting a coordinate of the compensation pixel;

converting the black pixel of the notice pixel to a multi-valued half tone pixel;

outputting the multivalued half tone pixel based on the coordinate of the notice pixel;

converting the white pixel of the compensation pixel to a multivalued half tone pixel; and outputting the multivalued half tone pixel based on the coordinate of the compensation pixel.

15. An image processing apparatus for outputting a multivalued image converted from a binary image, comprising:

a dot pattern analysis means for determining a plurality of black pixels neighboring a notice pixel of a predetermined positioned black pixel in a window of the binary image, and for determining a white pixel as a compensation pixel in the window in accordance with coordinates of the notice pixel and the plurality of black pixels;

a notice pixel multivalued means for converting the black pixel of the notice pixel to a multivalued half tone pixel, and for outputting the multivalued half tone pixel based on the coordinate of the notice pixel; and a compensation pixel multivalued means for converting the white pixel of the compensation pixel to a multivalued half tone pixel, and for outputting the multivalued half tone pixel based on the coordinate of the compensation pixel.

16. An image processing method for outputting a multivalued image converted from a binary image, comprising the steps of:

determining a plurality of black pixels neighboring a notice pixel of a predetermined positioned black pixel in a window of the binary image;

determining a white pixel as a compensation pixel in the window in accordance with coordinates of the notice pixel and the plurality of black pixels;

converting the black pixel of the notice pixel and the white pixel of the compensation pixel to each multivalued half tone pixel; and outputting the multivalued half tone pixels of the notice pixel and the compensation pixel.

* * * * *